United States Patent
Lee

(10) Patent No.: US 6,260,714 B1
(45) Date of Patent: Jul. 17, 2001

(54) SLUDGE FILTRATION APPARATUS HAVING CHAIN-TYPE BELT PRESS WITH FINE FIBERS OF SYNTHETIC RESIN JOINED THEREON

(75) Inventor: Jung Yup Lee, Seoul (KR)

(73) Assignees: Young Tae Kim; Kye Hyung Lee, both of Seoul (KR)

( * ) Notice: Subject to any disclaimer, the term of this patent is extended or adjusted under 35 U.S.C. 154(b) by 0 days.

(21) Appl. No.: 09/582,239

(22) PCT Filed: Mar. 26, 1999

(86) PCT No.: PCT/KR99/00134

§ 371 Date: Jul. 25, 2000

§ 102(e) Date: Jul. 25, 2000

(87) PCT Pub. No.: WO00/50347

PCT Pub. Date: Aug. 31, 2000

(30) Foreign Application Priority Data

Feb. 23, 1999 (KR) .................................................. 99-5876

(51) Int. Cl.[7] .................................................. B01D 33/056
(52) U.S. Cl. .......................... 210/391; 210/396; 210/400; 210/401; 210/232
(58) Field of Search .................................... 210/400, 401, 210/391, 396, 232

(56) References Cited

U.S. PATENT DOCUMENTS

| 1,833,315 | * | 11/1931 | Burhans . |
| 5,891,342 | * | 4/1999 | Tije . |

FOREIGN PATENT DOCUMENTS

| 55-84513 | 6/1980 | (JP) . |
| 60-49894 | 3/1985 | (JP) . |
| 3-072905 | * 3/1991 | (JP) . |
| 20-0155335 | 2/1999 | (KR) . |

* cited by examiner

*Primary Examiner*—Thomas M. Lithgow
(74) *Attorney, Agent, or Firm*—Joacobson Holman PLLC

(57) ABSTRACT

A sludge filtration apparatus having chain type belt press with fine fibers of synthetic resin joined thereon wherein a pressing belt (50) for pressing the sludge on and with the filtering belt makes the sludge into the sludge cake, said filtering belt includes a chain (20) being engaged with plural of sprockets of the rollers (40,41,42, 43) and a water absorbing and filtering portion (34) fixed on the chain (20), and wherein said absorbing and filtering portion (34) includes filtering units (33) and elongate grooves (12) for coupling detachably with the filtering units (33).

5 Claims, 5 Drawing Sheets

SLUDGE FILTRATION APPARATUS HAVING CHAIN-TYPE BELT PRESS WITH FINE FIBERS OF SYNTHETIC RESIN JOINED THEREON

TECHNICAL FIELD OF THE INVENTION

This invention relates to sludge filtration apparatus. More particularly, it relates to sludge filtration apparatus having chain-type belt press with fine synthetic resin fiber joined thereon, the filtering units of the belt press easily and detachably mounted, and the sludge compressed by the belt press including not only the filtering belt but also the pressing belt pressed by the compressing rollers.

BACKGROUND ART OF THE INVENTION

In the various kinds of industrial fields, generally, waste water is discharged in a considerable abundance. The treatment process of the waste water creates inevitably a considerable amount of the sludge which contains water. When the contained water is extracted from the sludge, it becomes so called "sludge cake". It is preferable that the amount of contained water of sludge cake could be reduced as low as possible in order to deal with it easily after fact.

In a sludge filtration apparatus of the prior art, 2 sheets of filtering fabrics or nets are arranged on the low and high portions of the main frame respectively. And the filtering fabrics or nets move along around plural number of rollers under tension produced by a pair of rollers in order to dehydrate the sludge.

In such a sludge filtration apparatus of the prior art, there are several problems as followings First, the filtering fabrics or nets tend to be always and seriously contaminated by particles of sludge. Hence, timely, they have to be washed with enormous amount of water.

Second, since the filtering fabrics or nets are tensioned to dehydrate the sludge, they are continuously and excessively stretched and rubbed against the rollers by tension and turning force of rollers. As a result, the fabrics or nets tend to be worn out and damaged in relatively earlier stage to shorten lifetime thereof.

Third, in the prior art, frequent trouble of the run-off-the-track preventing device causes the filtering fabrics or nets to be broken down, and tends to halt the dehydrating process of sludge repeatedly for a short time or a long time occasionally.

Fourth, the sludge filtration apparatus of the prior art has a complicated structure which includes driving devices, tension controlling devices, washing devices, run-off-the-track preventing devices and so forth. Therefore, so many operators should check and maintenance the equipments continuously and frequently to spend large labor time in managing the large and complex facilities hardly. Also, frequent checking and maintenances require the casings of the equipments to be often opened, so that the opened equipments discharge contaminated airs which makes bad smell and air pollution unavoidable in the factory environments.

Fifth, in order to reduce the amount of the contained water of sludge cake rapidly and effectively, it would be preferable that sludge on the filtering fabrics or nets can be pressed between a pair of roller (pressing technique) or be sucked by suction device (sucking technique). In the above prior art, however, both such a pressing technique and sucking technique could not be available to the apparatus because these techniques cause sludge as well as water to pass the fabrics or nets, and cause the fabrics or nets to be clogged by the dust or dirt lumps and to be useless rapidly. So, in the prior art, in order to dehydrate sludge, areas of meshes in the filtering fabrics or nets should be widen only by applying the tension to the fabrics or nets (tension technique). But in the tension technique of prior art, workability is relatively low, and it requires many times in processing. And the resulted sludge cake of the above prior art has relatively higher amount of contained water.

In order to solve the problems of the prior art mentioned above, the 30 applicant of this invention filed Korean Utility Model No. 1997-18821 which discloses a sludge filtration apparatus including pressing rollers and a filtering belt. The filtering belt of '1997-18821 has plural of filtering units with chemical resistant fine fibers of synthetic resin joined thereon, and a thick rubber belt on which plural of through-holes for passing sludge water are formed and to which the filtering units are attached one after another along the longitudinal direction of the rubber belt.

In the sludge filtration apparatus of '18821, in first, water of sludge is absorbed on the fine fibers of synthetic resin of the filtering units. Then the sludge and filtering units are pressed between a pair of rollers to extract water from them to yield to the sludge cake. So, the resulted sludge cake of the '18821 can has less amount of contained water than the above prior art's.

In the '18821, however, there are also some problems as followings

First, in the apparatus of '18821, the filtering units are attached to the rubber belt in a manner that the rubber belt has a flexible rod fixed on the bottom thereof and the filtering units are tied up to the flexible rod by a metal wire. When the filtering units are worn out or damaged and have to be replaced with new ones, operator should untie the old one from the rod and then again tie new one up manually. Therefore, so much time and labors should be required in the replacement work.

Second, in the apparatus of '18821, since only the rollers are involved in pressing sludge on the filtering unit, there is a limit to reducing the amount of contained water of the resulted sludge cake.

DISCLOSURE OF THE INVENTION

In view of the problems of the prior art and Korean Utility Model No. 1997-18821, It is an object of the present invention to provide a sludge filtration apparatus having chain type belt press with fine fibers of synthetic resin joined thereon which is designed such that the filtering units can be easily and rapidly displaced and relatively less time and labor can be required in maintenance and repair.

And it is another object of the present invention to provide a sludge filtration apparatus having chain type belt press with fine fibers of synthetic resin joined thereon which can produce the sludge cake having less amount of contained water than any prior arts.

And it is still another object of the present invention to provide a sludge filtration apparatus having chain type belt press with fine fibers of synthetic resin joined thereon in which it can be realized that the whole time for stopping the processing due to trouble or maintenance should be spent as less as possible.

In accordance with the invention, a sludge filtration apparatus having chain type belt press with fine fibers of synthetic resin joined thereon comprising: a frame; a filtering belt for receiving and carrying the sludge supplied by the sludge supplier; a driving roller fixed on the frame for driving the filtering belt wound therearound; a tension controlling means fixed on the frame for controlling the tension of the filtering belt out of the closed casing of the apparatus; and guide rollers fixed on the frame for guide the filtering belt wound therearound;

wherein said sludge filtering apparatus further comprising a pressing belt for pressing the sludge on and with the filtering belt to make the sludge into the sludge cake, said pressing belt being driven by a driving roller and pressed by plural of compressing rollers;

wherein said filtering belt includes: a chain being engaged with plural of sprockets of the driving roller, the tension controlling roller and the guide rollers; and a water absorbing and filtering portion fixed on the chain for filtering the sludge and absorbing water contained in it; wherein said absorbing and filtering portion includes; filtering units each of them having the chemical resistant fine fibers of synthetic resin in a predetermined width and thickness, a binding rod for holding the fine fibers by binding together the ends of fibers therearound, and a holding piece for fitting detachably the binding rod therein; elongate grooves each of them having triangle shape in cross section for fitting detachably the holding piece therein; and support plates, each of them formed integrally with the elongate groove for supporting the fine fibers thereon, said each of support plates extending horizontally from both sides of the upper ends of the elongate grooves and having plural of water passing holes for passing water extracted from the fine fibers.

In a preferred embodiment, the sludge filtration apparatus further comprising; cleaning means for washing off and brushing remaining particle of the sludge from the fine fibers which have had the sludge cake removed previously upper stream therefrom; a bath for receiving the removed particle and waste water from the cleaning means and other parts; and an absorbing and drying device disposed in last downstream of the filtering belt for absorbing and drying the fine fibers which have been cleaned previously upper stream.

In a another preferred embodiment, the sludge filtration apparatus further comprising; a tension controlling means for controlling the tension of the pressing belt out of closed casing of the apparatus; and guide rollers for the pressing belt wound therearound; wherein said compressing rollers are arranged in line along the pressing belt and compressing strength of said compressing rollers gradually increase in the direction of downstream of the filtering belt.

In a still another preferred embodiment, in the sludge filtration apparatus mentioned above, said pressing belt has V shape protruding belts on both ends thereof and therearound, at least one of the pressing belt driving roller, pressing belt tension controlling roller, pressing belt guide rollers and compressing rollers have V shape grooves on both end thereof and therearound respectively, and said V shape grooves being, in complementary shape, engaged with the V shape protruding belts to prevent the pressing belt from running off the track.

In the still another embodiment, in the sludge filtration apparatus mentioned above, said chain has coupling units connected in line with each other and support pieces integrally formed with the coupling units and extending horizontally in the direction perpendicular to stream direction of the filtering belt, whereby said coupling units and the teeth of said sprockets can be engaged with each other respectively to prevent the filtering belt from running off the track.

BRIEF DESCRIPTION OF DRAWINGS

A preferred embodiment of the invention is discussed in detail below with reference to the attached drawing figures, wherein.

BEST MODE FOR CARRYING OUT THE INVENTION

Hereinafter, preferred embodiments of the present invention will be described with reference to the accompanying drawings.

Figure 1:
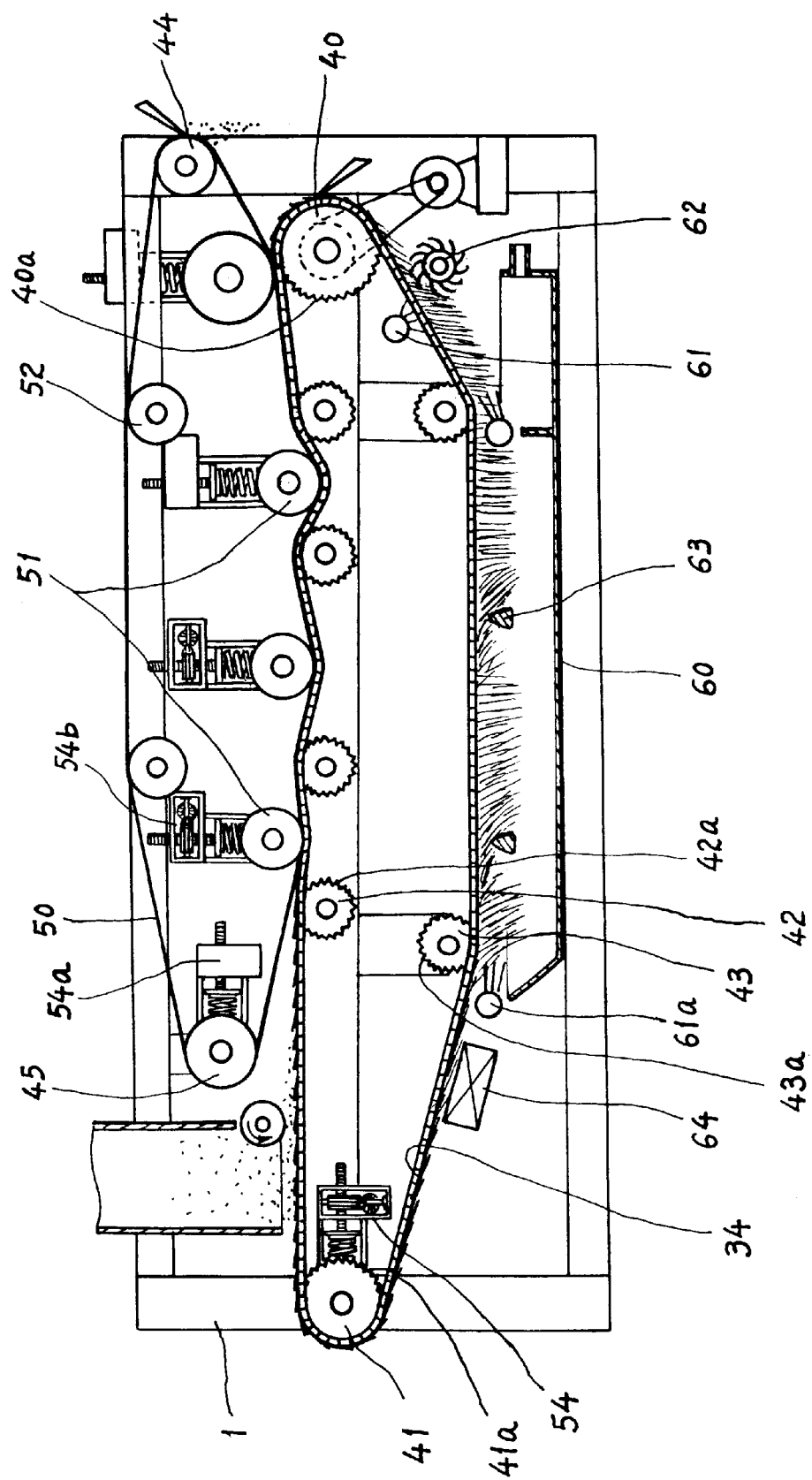
FIG. 1 is a whole schematic view of the sludge filtration apparatus having belt press with fine fibers of synthetic resin joined thereon, constructed in accordance with an embodiment of the present invention.
Figure 2:
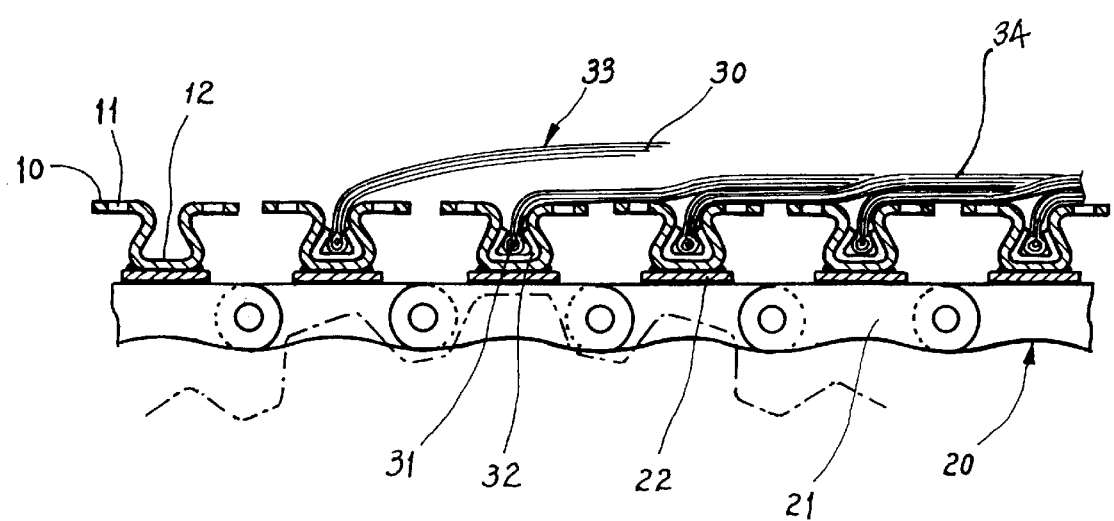
FIG. 2 is a sectional view of a filtering belt as main portion of the present invention.

FIG. 1 is a whole schematic view of the sludge filtration apparatus having belt press with fine fibers of synthetic resin joined thereon, constructed in accordance with an embodiment of the present invention. In the drawing, reference numeral "1" indicates a frame on which both driving roller 40 and tension controlling roller 41 for a filtering belt are mounted (see both left and right ends of the apparatus in FIG. 1). FIG. 2 shows a sectional view of the filtering belt which is wound around the driving roller 40 and tension controlling roller 41 as shown in FIG. 1.

Referring to FIG. 1, the tension of the filtering belt can be controlled by adjusting a worm device 54 coupled with tension controlling roller 41. Upper the filtering belt, a pressing belt 50 is wound around a driving roller 44 and tension controlling roller 45. The belt press includes the filtering belt and the pressing belt 50 which are pressed against with each other by compressing rollers 51 in operation. The compressing strength of the rollers 51 gradually increase in the direction of downstream (i.e., in the clockwise direction of the filtering belt) to effectively dehydrate the sludge on the fine fibers 30 of the filtering belt.

Figure 6:
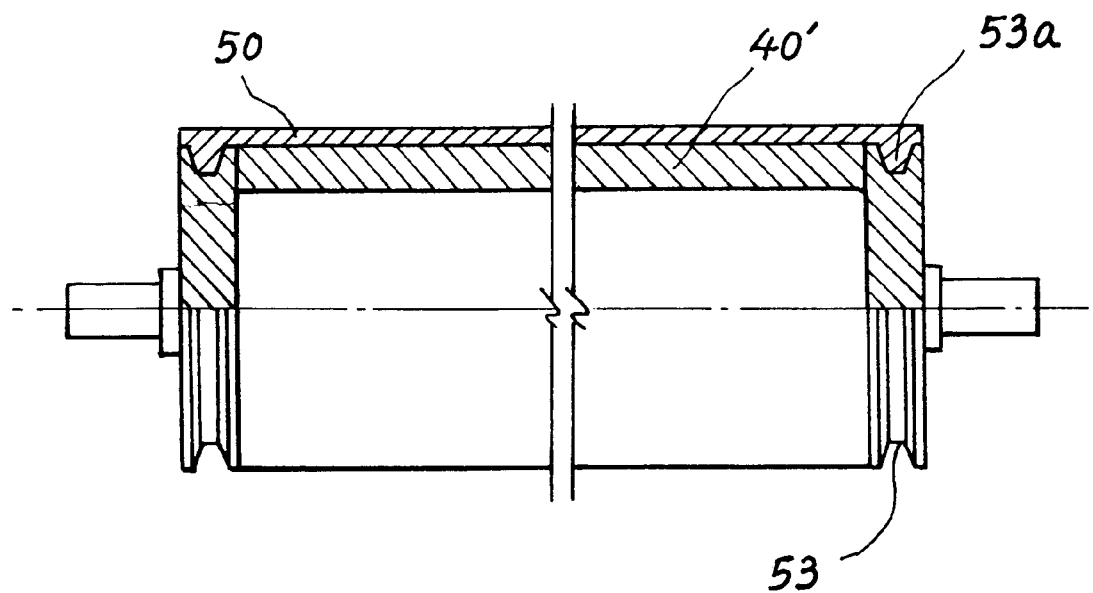
FIG. 6 are the sectional view of a driving roller engaged with the pressing belt.

Referring to FIG. 6, at least one of the rollers 44, 45, 51 and 52 have "V" shape grooves 53 formed around the both ends thereof. And the pressing belt 50 has "V" shape protruding belts 53a around both ends thereof. The grooves 53 and the protruding belts 53 are so complementary in shape that they can be well engaged with each other to prevent the pressing belt 50 around the rollers 44, 45, 51 and 52 from running off the track in operation of the apparatus.

Referring to FIG. 1, tension of the pressing belt 50 can be controlled by adjusting the first worm device 54a coupled with tension controlling roller 45. The pressing strength in close contact between the pressing belt 50 and the filtering belt can be controlled by adjusting the second worm devices 54b coupled with the compressing rollers 51.

The worm device 54 for the filtering belt and the first and second worm devices 54a, 54b can be all operated out of the casing of the apparatus to prevent contaminated air from coming out to the environments. And instead of the structure of the worms shown in the drawings, they may be constructed by using hydraulic cylinders.

In FIG. 1, reference numeral 61 indicates first shower which supplies water to the filtering belt to wash the remaining debris or dust of sludge therefrom after the sludge cake has been removed from the filtering belt, reference numeral 62 indicates brush for brushing the remaining particles of sludge from the fine fibers 30 (see FIG. 2) also after the sludge cake has been removed. And reference numeral 60 indicates a washing bath which the washing rods 63 are disposed to hit and scratch the fine fibers 30 and remove the remaining dust from them further downstream of the filtering belt from the rods 63, also is second washer 61a disposed to further wash the filtering belt including the fine fibers 30. Still further downstream from the second washer 61a, there is disposed a water absorbing and drying device 64 for drying the fine fibers 30 of the filtering belt.

Figure 3:
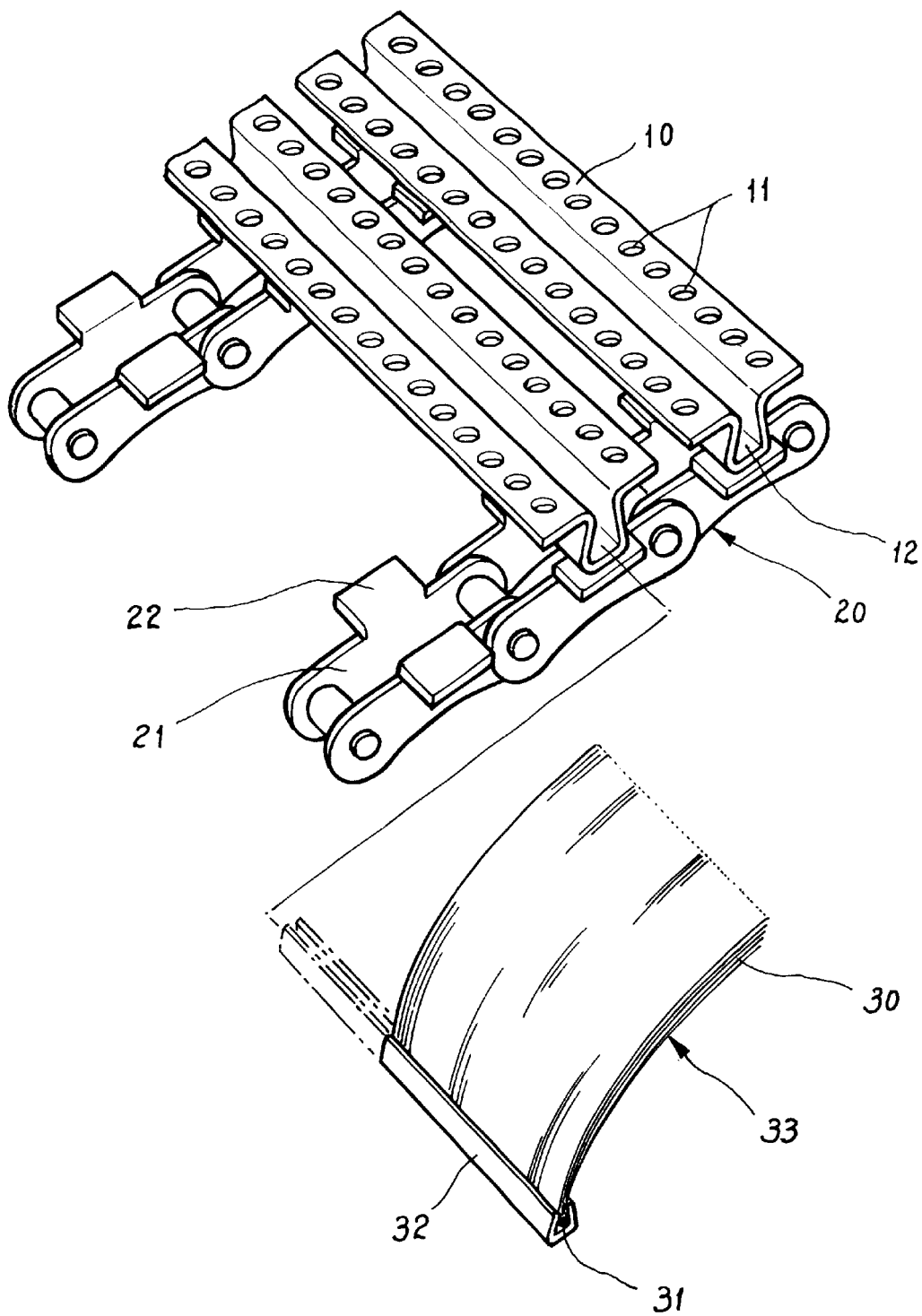
FIG. 3 is a exploded perspective view of the filtering belt.

Referring to FIG. 2 and 3, the filtering belt which is one of the main portion of the present invention will be described hereinafter. FIG. 2 is a sectional view of the filtering belt, and FIG. 3 is a perspective view of the filtering belt in which a filtering units 33 are removed from therefrom.

Referring to FIG. 2, the filtering belt of the present invention includes a water absorbing and filtering portion 34 and a chain 20 for carrying the water absorbing and filtering portion 34.

The water absorbing and filtering portion 34 includes the filtering units 33 which has a binding rod 31 with a predetermined width and thickness of flux of chemical resistant fine fibers bound thereon and a holding piece 32 for fitting the binding rod 31 therein. Also the portion 34 includes elongate grooves 12 through which the holding piece 32 are fitted to combine the filtering units 33 with the portion 34 in one body, and a support plates 10 extending horizontally in the direction of the left and right of the upper portion of the elongate grooves 12. The support plates 10 are formed integrally with the grooves 12 as shown in FIG. 3.

FIG. 2 shows the filtering units 33 are inserted detachably in the elongate grooves 12 having triangle shape in cross section, also no filtering unit 33 inserted in the groove 12 of the leftmost portion of the drawing. Also, the holding pieces 32 have a triangle shape in cross section to match with the elongate grooves The lower portion of the FIG. 3 shows the structure of the filtering units 33 in which it includes the fine fibers 30 of which flux has a predetermined width and thickness, the binding rods 31 for binding the fine fibers 30, and the holding piece 32 for fitting detachably the binding rods 31 therein. As shown in the upper portion of FIG. 3, the support plates 10 have a predetermined size of water passing holes arranged along the longitudinal direction thereof. The adjacent support plates 10 arc separated from each other at interval enough not to be touched with each other in operation in order to prevent the plates 10 from being contacted with each other in operation and producing noises in the industrial fields.

Returning to FIG. 2, the chain 20 is joined with the water absorbing and filtering portion 34 by welding between the support pieces 22 of the chain and bottom of the elongate grooves 12. That is, the chain 20 has plural of coupling units 21 and support pieces 22 which are formed integrally with the coupling units 21 and joined with the elongate grooves 12 by welding or other joining methods.

As shown in FIG. 1, the chain 20 is engaged with the sprockets 40a, 41a, 42a and 43a, of the rollers. FIG. 2 shows in enlarged view, that the coupling units 21 of the chain 20 (solid line) are engaged with the sprockets (one point dotted line).

The operation of the sludge filtration apparatus according to the embodiment of present invention will be described hereinafter.

In the sludge filtration apparatus of the present invention, first, a sludge supplying portion (shown left and upper portion of the FIG. 1) supplies the sludge onto the filtering belt. Then, the fine fibers 30 of the filtering belt absorb water from the sludge by capillarity thereof. The density of the sludge suitable to the apparatus of the present invention would be 7 wt % or more. If the density of the sludge is less than 7 wt %, it is preferable that the sludge could be concentrated no less than 7 wt % by concentration method or deposition method.

The filtering belt moves in the clockwise direction by the driving roller 40, while the pressing belt 50 moves in the counterclockwise direction by the driving roller 44. Therefore, while the sludge on the filtering belt is moving in the direction of downstream, it can be pressed and changed into the sludge cake between the filtering belt and the pressing belt 50 under the pressing force of the compressing rollers 51. The resulted sludge cake has much less amount of contained water. As described above, since the pressing strength of the rollers 51 gradually increases in the direction of the downstream, the effectiveness of dehydrating the sludge can be further improved. Also, in the apparatus of the present invention, since the sludge is pressed not only by the compressing rollers 51 but also by the pressing belt 50, the effectiveness of dehydrating the sludge can be still higher than the prior arts.

Figure 4:
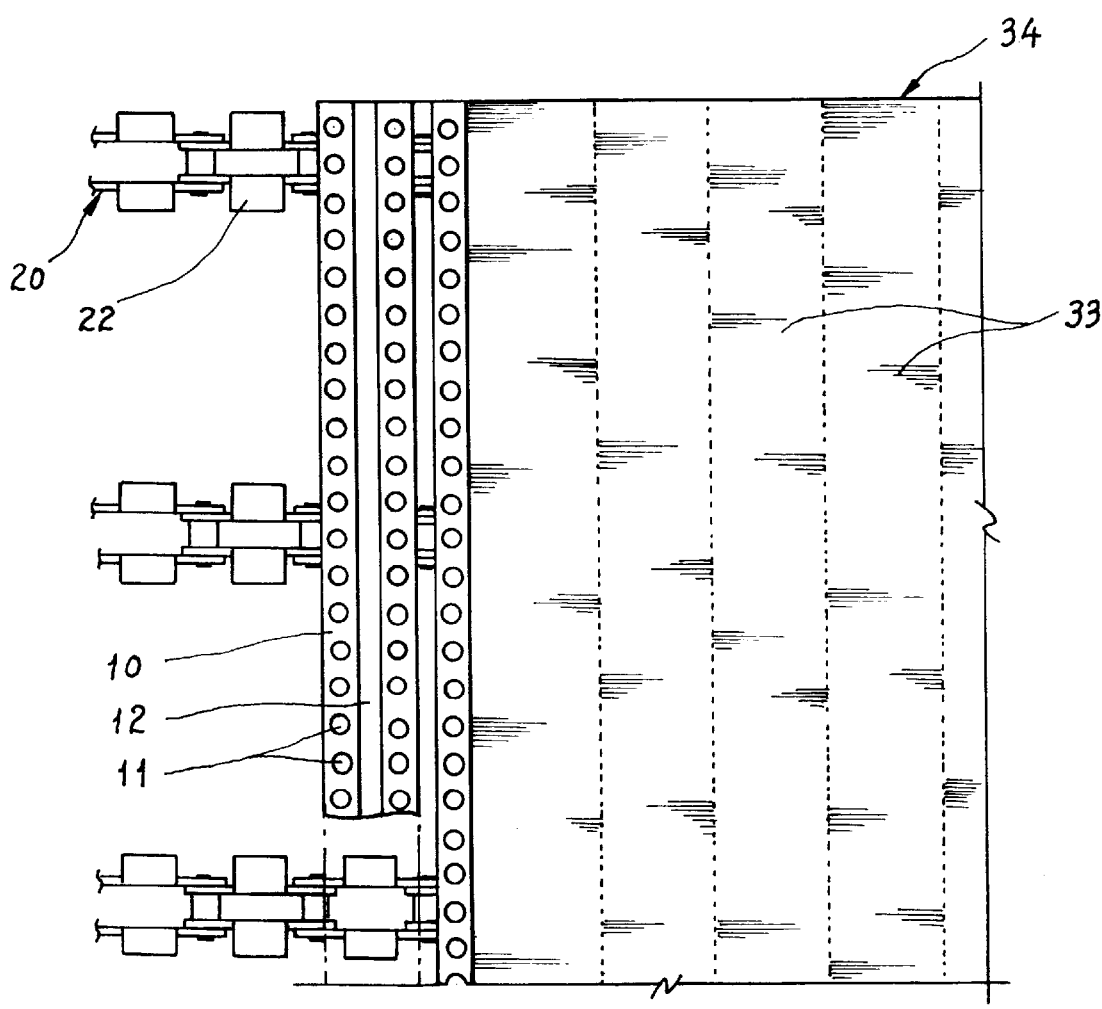
FIG. 4 is a partly exploded plan view of the filtering belt.
Figure 5:
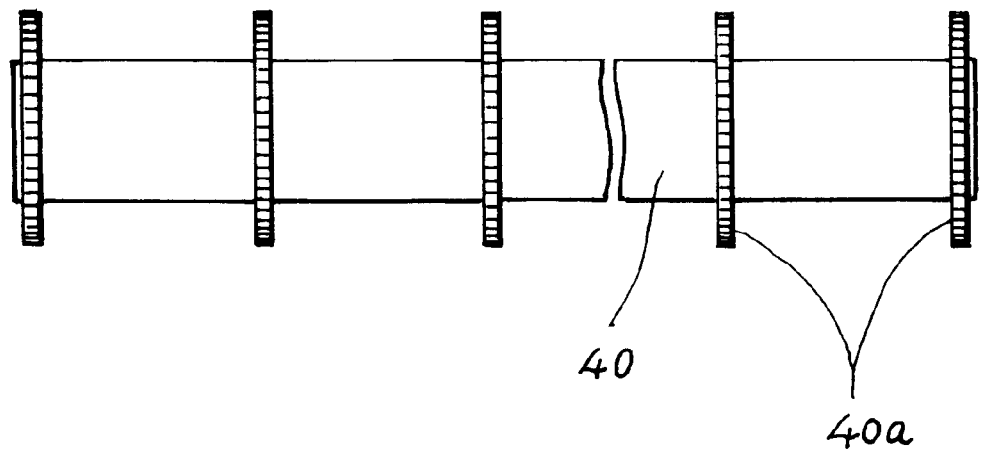
FIG. 5 is a sectional view of a roller for driving the filtering belt, taken along the line II—II of the FIG. 1

As shown in FIG. 6, the combination of the V shape protruding belt 53a with the V shape grooves 53 of the rollers 44, 45, 51 and 52 can prevent the pressing belt 50 from running off the track in operation, as mentioned above. And the combination of the chain 20 with the sprockets 40a, 41a, 42a and 43a can prevent the filtering belt from running off the track in operation, also as mentioned above. FIG. 4 shows the relationship between the water absorbing and filtering portion 34 and chain 20, and as a example, FIG. 5 shows the driving roller 40 with the sprockets 40a integrally joined around it. So, from the FIG. 4 and FIG. 5 it can be imagined that the coupling units 21 of the chain 20 would be engaged with the teeth of the sprockets.

Now, returning to the course of process, the sludge cake which has passed beyond the press belt 50 leaves the filtering belt and then is received in the sludge cake receiving part (not shown, but corresponding to the rightest portion of the filtering belt in the FIG. 1). Then the filtering belt which has no sludge cake thereon passes sequently the first shower (61) for washing the remaining debris or dust of sludge on the filtering belt out, the brush 62 for brushing the remaining particles of the sludge from it, washing rods 63 in the washing bath 60 for shaking off the still remaining dust from it, the second shower 61 a, and the water absorbing and drying device 64 for dehydrating the fine fibers 30 of the filtering belt. Then the process in the apparatus completes one cycle. And for the next cycle, the filtering belt returns to the original place to receive the sludge which is being dropped from the sludge supplier as mentioned above. Then the process repeats the same cycle as of previous one.

In accordance with the sludge filtration apparatus mentioned above, the present invention can have the working effects as followings:

First, since the filtering units 33 are detachably coupled with the filtering belt in a manner that the holding pieces 32 of the filtering units 33 are engaged with the elongate grooves 12 of the water absorbing and filtering portion 34, the filtering unit 33 which may be worn out or breakdown can be easily and quickly replaced with new one.

Second, not only the compressing rollers 51 of which compressing strength gradually increase in the direction of downstream of the filtering belt, but also the pressing belt 50 which cooperates with filtering belt is involved in pressing the sludge on the filtering belt, so that the effectiveness of the dehydrating the sludge and the fine fibers (30) can be further improved to obtain the sludge cake having much less amount of contained water than any prior art.

Third, in the apparatus of the present invention, the complex running-off-the-track preventing equipment is not required, As a result, it is possible to obtain the apparatus of which configuration can be smaller in size, tighter and more simple, and also to minimize the halt time of process and time and fee for maintenance.

Modification to the above would be obvious to those of ordinary skill in the art, but would not bring the invention so modified beyond the scope of the appended claims.

What is claimed is:

1. A sludge filtration apparatus having chain type belt press with fine fibers of synthetic resin joined thereon, said apparatus comprising:

a frame (1);

a filtering belt for receiving and carrying the sludge supplied by the sludge supplier;

a driving roller (40) fixed on the frame for driving the filtering belt wound therearound;

a tension controlling means (41, 54) fixed on the frame for controlling the tension of the filtering belt out of the closed casing of the apparatus; and guide rollers (42, 43) fixed on the frame for guide the filtering belt wound therearound;

wherein said sludge filtering apparatus further comprising a pressing belt (50) for pressing the sludge on and with the filtering belt to make the sludge into the sludge cake, said pressing belt (50) being driven by a driving roller (44) and pressed by plural of compressing rollers (51);

wherein said filtering belt includes:

a chain (20) being engaged with plural of sprockets (40a, 41a, 42a, 43a) of the driving roller (40), the tension controlling roller (41) and the guide rollers (42, 43); and a water absorbing and filtering portion (34) fixed on the chain (20) for filtering the sludge and absorbing water contained in it;

wherein said absorbing and filtering portion (34) includes;

filtering units (33), each of them having the chemical resistant fine fibers (30) of synthetic resin in a predetermined width and thickness, a binding rod (31) for holding the fine fibers (30) by binding together the ends of fibers (30) therearound, and a holding piece (32) for fitting detachably the binding rod (31) therein;

elongate grooves (12) each of them having triangle shape in cross section for fitting detachably the holding piece (32) therein; and support plates (10), each of them formed integrally with the elongate groove (12) for supporting the fine fibers (30) thereon, said each of support plates (10) extending horizontally from both sides of the upper ends of the elongate grooves (12) and having plural of water passing holes (11) for passing water extracted from the fine fibers (30).

2. A sludge filtration apparatus as claimed in claim 1 wherein the sludge filtration apparatus further comprising;

cleaning means (61, 61a, 62, 63) for washing off and brushing remaining particle of the sludge from the fine fibers (30) which have had the sludge cake removed previously upperstream therefrom;

a bath (60) for receiving the removed particle and waste water from the cleaning means and other parts; and an absorbing and drying device (64) disposed in last downstream of the filtering belt for absorbing and drying the fine fiber (30) which have been cleaned previously upperstream.

3. A sludge filtration apparatus as claimed in claim 1 wherein the sludge filtration apparatus further comprising;

a tension controlling means (45, 54a) for controlling the tension of the pressing belt (50) out of closed casing of the apparatus; and guide rollers (52) for the pressing belt (50) wound therearound;

wherein said compressing rollers (51) are arranged in line along the pressing belt and compressing strength of said compressing rollers (51) gradually increase in the direction of downstream of the filtering belt.

4. A sludge filtration apparatus as claimed in claim 3 wherein said pressing belt (50) has V shape protruding belts (53a) on both ends thereof and therearound, at least one of the pressing belt driving roller (44), pressing belt tension controlling roller (45), pressing belt guide rollers (52) and compressing rollers (51) have V shape grooves (53) on both end thereof and therearound respectively, and said V shape grooves (53) being, in complementary shape, engaged with the V shape protruding belts (53a) to prevent the pressing belt (50) from running off the track.

5. A sludge filtration apparatus as claimed in claim 1 wherein said chain (20) has coupling units (21) connected in line with each other and support pieces (22) integrally formed with the coupling units (21) and extending horizontally in the direction perpendicular to stream direction of the filtering belt, whereby said coupling units (21) and the teeth of said sprockets (40a, 41a, 42a and 43a) can be engaged with each other respectively to prevent the filtering belt from running off the track.

* * * * *